United States Patent
Wei et al.

(10) Patent No.: US 12,082,552 B1
(45) Date of Patent: Sep. 10, 2024

(54) MULTIFUNCTIONAL ANIMAL EXPOSURE EXPERIMENTAL DEVICE

(71) Applicant: ZHEJIANG UNIVERSITY, Hangzhou (CN)

(72) Inventors: Jianjian Wei, Hangzhou (CN); Yijia Chen, Hangzhou (CN); Huoquan Zhu, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 18/628,817

(22) Filed: Apr. 8, 2024

Related U.S. Application Data

(63) Continuation of application No. PCT/CN2023/103365, filed on Jun. 28, 2023.

(30) Foreign Application Priority Data

Mar. 16, 2023 (CN) .......................... 202310255037.8

(51) Int. Cl.
*A01K 1/03* (2006.01)
*B01F 23/20* (2022.01)
(Continued)

(52) U.S. Cl.
CPC ............ *A01K 1/031* (2013.01); *B01F 23/213* (2022.01); *B01F 23/291* (2022.01);
(Continued)

(58) Field of Classification Search
CPC ......... A01K 1/031; A01K 1/03; B01F 35/187; B01F 23/808; B01F 23/291; B01F 23/213; B01F 2101/23
(Continued)

(56) References Cited

U.S. PATENT DOCUMENTS 3,464,388 A * 9/1969 Stout ...................... A01K 1/031
                                                       261/92
4,348,985 A    9/1982 Leong et al.
(Continued)

FOREIGN PATENT DOCUMENTS

CN          104367398 A       2/2015
CN          204841720 U      12/2015
(Continued)

*Primary Examiner* — Ebony E Evans
(74) *Attorney, Agent, or Firm* — Bayramoglu Law Offices LLC

(57) ABSTRACT

A multifunctional animal exposure experimental device is provided. A multi-route transmission system is provided in an aerosol exposure system; an environmental temperature compensation system is provided in a biosafety system; an aerosol generation module communicates with a mixing chamber; the mixing chamber and a donor animal chamber alternatively communicate with a recipient animal chamber through an aerosol particle size screening module; an aerosol sampling system is connected to a sampling port of the mixing chamber, a sampling port of the donor animal chamber and a sampling port of the recipient animal chamber; an outlet of the constant temperature and humidity air producing device communicates with a first adjustment air inlet of the mixing chamber or a second adjustment air inlet of the donor animal chamber. This device enables quantification of transmission risks via different routes under controlled environmental conditions.

5 Claims, 10 Drawing Sheets

(51) Int. Cl.
*B01F 23/213* (2022.01)
*B01F 23/80* (2022.01)
*B01F 35/00* (2022.01)
*B01F 101/23* (2022.01)

(52) U.S. Cl.
CPC .......... *B01F 23/808* (2022.01); *B01F 35/187* (2022.01); *B01F 2101/23* (2022.01)

(58) Field of Classification Search
USPC ........................................................ 119/420
See application file for complete search history.

(56) References Cited

U.S. PATENT DOCUMENTS

| | | | | |
|---|---|---|---|---|
| 4,968,974 A * | 11/1990 | Sakano | ................. | A01K 1/031 |
| | | | | 250/221 |
| 8,602,026 B2 * | 12/2013 | Fuhrman | ........... | A61M 16/0051 |
| | | | | 128/204.26 |
| 9,180,263 B2 * | 11/2015 | Gumaste | ................. | A61D 7/04 |
| 9,943,388 B2 * | 4/2018 | Cole | ........................ | A61D 7/04 |
| 11,828,740 B2 * | 11/2023 | Mark Danieli | ...... | G01N 33/493 |

FOREIGN PATENT DOCUMENTS

| | | |
|---|---|---|
| CN | 105651944 A | 6/2016 |
| CN | 112807127 A | 5/2021 |
| CN | 113804037 A | 12/2021 |
| CN | 217677538 U | 10/2022 |
| KR | 20120037096 A | 4/2012 |

\* cited by examiner

MULTIFUNCTIONAL ANIMAL EXPOSURE EXPERIMENTAL DEVICE

CROSS-REFERENCE TO THE RELATED APPLICATIONS

This application is a continuation application of International Application No. PCT/CN2023/103365, filed on Jun. 28, 2023, which is based upon and claims priority to Chinese Patent Application No. 202310255037.8, filed on Mar. 16, 2023, the entire contents of which are incorporated herein by reference.

TECHNICAL FIELD

The present invention belongs to an animal experimental device in the technical field of experimental systems, and particularly relates to a multifunctional animal exposure experimental device.

BACKGROUND

A number of pathogens causing outbreaks of respiratory infectious diseases can be transmitted via droplet, aerosol and fomite routes. At present, relative importance of different transmission routes still remains controversial. For the aerosol route, its contribution in the transmission events, and the effect of aerosol size and environmental parameters like temperature and humidity, need further investigation. Animal models are generally used to evaluate the transmissibility of bacteria or viruses. Hence, a multifunctional animal exposure experimental device is necessary, in order to efficiently determine the major transmission routes of respiratory infections and key influencing factors, which is of great importance in disease control and prevention.

There have been several animal exposure devices worldwide. In the device developed by the University of Hong Kong, China for influenza transmission among ferrets, impactors with cutoff sizes of 9.9 μm, 5.3 μm, 2.5 μm and 1.0 μm, respectively, are used to select aerosols from the donor chamber housing infected ferrets into the recipient chamber housing the innocent ferrets, at an air flow of 30 L/min. An aerodynamic particle sizer (APS) is used to characterize particle sizes in the donor chamber at a flow of 5 L/min. During the experiment, bioaerosol samplers by National Institute for Occupational Safety and Health (NIOSH) are used to characterize virus concentration in both donor and recipient chambers at a flow of 3.5 L/min. The experiment is performed in P2 lab, and the temperature and relative humidity are measured as 24.2±0.9° C. and 57.3±5.5%, respectively. However, the system cannot automatically adjust the temperature and the humidity. The bioaerosol only comes from the donor animal, and only the aerosol route is investigated. According to an exposure experimental device developed by the Laboratory of Virology of the U.S. National Institutes of Health for a SARS-CoV-2 virus of Syrian hamsters, a recipient hamster and a donor hamster are housed in the same feeding cage, but separated by a perforated plastic clapboard to prevent direct contact of hamsters. Air inlet is located at the donor side. The plastic clapboard can also be removed for a direct contact transmission experiment. There are sampling holes at each side for air sampling and virus analysis. However, the system cannot automatically adjust the temperature and the humidity. Sizes of the aerosol exposed to the recipient cannot be controlled, and the bioaerosol also only comes from the donor animal which cannot be adjusted and is not friendly in repeatability.

SUMMARY

Objective of the present invention is to provide a multifunctional animal exposure experimental device to solve problems in the background art.

The present invention adopts the following technical solutions.

The present invention provides a multifunctional animal exposure experimental device, including an aerosol exposure system, a multi-route transmission system, an aerosol sampling system, an air flow temperature-humidity control system, an environmental temperature compensation system, and a biosafety system, where the multi-route transmission system is installed in the aerosol exposure system; the aerosol sampling system and the air flow temperature-humidity control system are connected to the aerosol exposure system; and the environmental temperature compensation system is provided in the biosafety system.

The aerosol exposure system includes an aerosol generation module, a mixing chamber, a donor animal chamber, an aerosol particle size screening module, and a recipient animal chamber; an output end of the aerosol generation module communicates with the mixing chamber through a tube; and the mixing chamber and the donor animal chamber communicate with the recipient animal chamber through the aerosol particle size screening module.

The aerosol generation module includes a first pump and an aerosol generation device; an output end of the first pump is connected to an input end of the aerosol generation device through a tube; the tube from the first pump to the aerosol generation device is sequentially provided with a first flowmeter and a first filter; and an output end of the aerosol generation device is connected to the mixing chamber.

The mixing chamber includes a mixing chamber cavity; a first adjustment air inlet, a first aerosol inlet and a first sampling port are formed at one side of the mixing chamber cavity; the first adjustment air inlet is connected to the air flow temperature-humidity control system through a tube; the first aerosol inlet is connected to the output end of the aerosol generation device through a tube; a first aerosol outlet and a second sampling port are formed at the other side of the mixing chamber cavity; the first aerosol outlet is connected to the aerosol particle size screening module through a tube; the first sampling port and the second sampling port at two sides of the mixing chamber cavity respectively communicate with two aerosol sampling systems; the other side of the mixing chamber cavity provided with the first aerosol outlet is further provided with a first sensor; and the first sensor is electrically connected to the air flow temperature-humidity control system.

A first glass window for observation is formed in a sidewall of the donor animal chamber; a second adjustment air inlet, a second aerosol outlet and a third sampling port are respectively located on a lower part, an upper part and a top of the donor animal chamber; the second adjustment air inlet is connected to the air flow temperature-humidity control system through a tube; the second aerosol outlet is connected to the aerosol particle size screening module through a tube; the third sampling port communicates with the aerosol sampling system; a second sensor is located on the top of the donor animal chamber, and the second sensor is electrically connected to the air flow temperature-humidity control system.

The aerosol particle size screening module includes an impactor and an impactor stand; the impactor stand is set on the ground; the impactor is fixed on the impactor stand; ports are respectively formed at two sides of the impactor to serve as an inlet and an outlet of the impactor; the inlet of the impactor is connected to the first aerosol outlet of the mixing chamber or the second aerosol outlet of the donor animal chamber through a tube; the tube from the impactor to each of the first aerosol outlet and the second aerosol outlet is provided with first stop valves; and the outlet of the impactor is connected to the recipient animal chamber through a tube.

The recipient animal chamber includes a fan, a second wire cage, a second wire cage stand, a third feeding water bottle, a third trough, and a second pump; a second glass window for observation is formed in a sidewall of the recipient animal chamber; the second wire cage stand is fixed at a bottom of the recipient animal chamber; the second wire cage is located in the recipient animal chamber and set on the second wire cage stand; the third feeding water bottle and the third trough are provided in the second wire cage; the fan is provided on a top of a recipient chamber; the second wire cage does not come in contact with the fan; an exhaust air outlet, a second aerosol inlet and a fourth sampling port are respectively located on a lower part, an upper part and a top of the recipient animal chamber; the second aerosol inlet is connected to the outlet of the impactor through a tube; the exhaust air outlet is connected to the second pump through a tube; the tube from the exhaust air outlet to the second pump is provided with a second filter; the fourth sampling port communicates with the aerosol sampling system; the top of the recipient animal chamber is further set with a third sensor; and the third sensor is electrically connected to the air flow temperature-humidity control system.

The multi-route transmission system includes a contact avoidance module, an animal feeding module, and an animal behavior observation module; the contact avoidance module includes a first wire cage stand, a first wire cage, and a double-layer iron wire gauze; the first wire cage stand is fixed at a bottom of the donor animal chamber; the first wire cage is located in the donor animal chamber and set on the first wire cage stand; the double-layer iron wire gauze is set in a middle of the first wire cage, dividing an area in the first wire cage into two parts; the animal feeding module includes a second feeding water bottle, a second trough, and a first feeding water bottle, and a first trough; the first trough and the second trough are respectively provided in the two parts separated by the double-layer iron wire gauze; the second feeding water bottle and the first feeding water bottle are also respectively provided in the two parts separated by the double-layer iron wire gauze; the animal behavior observation module includes a monitoring camera; and the monitoring camera is set on the top of the donor animal chamber.

The aerosol sampling system includes a sampling analyzer and a third pump; an output end of the third pump is connected to the first sampling port in the mixing chamber, the second sampling port in the mixing chamber, the third sampling port in the donor animal chamber and the fourth sampling port in the recipient animal chamber through tubes; and the tube from the third pump to each of the first sampling port, the second sampling port, the third sampling port and the fourth sampling port is sequentially set with a second stop valve, the sampling analyzer and a third filter.

The air flow temperature-humidity control system includes a membrane dryer, a constant temperature and humidity air producing device and a computer; the membrane dryer includes an inlet communicating with an outside atmosphere, and an outlet communicating with an inlet of the constant temperature and humidity air producing device through a tube; an outlet of the constant temperature and humidity air producing device communicates with the first adjustment air inlet of the mixing chamber or the second adjustment air inlet of the donor animal chamber through a tube; the tube from the constant temperature and humidity air producing device to each of the first adjustment air inlet and the second adjustment air inlet is sequentially provided with a second flowmeter and a fourth filter; an insulating layer is set at the outside of a tube at the outlet of the constant temperature and humidity air producing device; and the constant temperature and humidity air producing device, the first sensor, the second sensor and the third sensor are electrically connected to the computer.

The environmental temperature compensation system includes an insulating layer, a phase-change material, an electric heating wire, a mixing fan, and a third glass window; the phase-change material, the electric heating wire and the mixing fan are set at a bottom of the insulating layer; a tube bulb is set at a top of the insulating layer; the third glass window is formed in a sidewall of the insulating layer; the mixing chamber, the donor animal chamber, the aerosol particle size screening module, the recipient animal chamber and the multi-route transmission system are set in the insulating layer; and the phase-change material, the electric heating wire and the mixing fan are electrically connected to the computer.

The biosafety system includes a biosafety cabinet cavity and a tube port; the tube port is formed in a sidewall of the biosafety cabinet cavity; and the mixing chamber, the donor animal chamber, the aerosol particle size screening module, the recipient animal chamber, the multi-route transmission system, the aerosol sampling system and the environmental temperature compensation system are set in the biosafety cabinet cavity.

The aerosol sampling system performs sampling using a cascade impactor sampling method, a liquid impactor sampling method or a membrane sampling method.

The flow-adjustable pump provides compressed air for the aerosol generation device. The flowmeter effectively controls an air flow entering the aerosol generation device. With the pump and the flowmeter, the air flow in the system can be controlled. The high-efficiency filter in the aerosol generation module is a membrane filter. It can block particles with a diameter bigger than or equal to 0.3 μm with filtration efficiency ≥95%. Various microbes in the air may be attached to the aerosol, so the air needs to be filtered to prevent interfering the experimental system.

The aerosol generation device is standard. A low pressure generated around a high-speed air flow brings a liquid out. The high-speed impact on a wall of a pressure resistant glass bottle breaks the liquid into small droplets, forming saturated aerosol. By changing the composition of the solution in the aerosol generation device, aerosols of different pathogen species and different pathogen loads are atomized, so as to conduct animal exposure experiments about airborne transmission routes.

The saturated aerosol generated by the aerosol generation device enters the mixing chamber cavity through the aerosol inlet. Adjusted air with specified temperature, humidity and air flow generated by the constant temperature and humidity air producing device enters the mixing chamber cavity through the adjustment air inlet. After the saturated aerosol is fully mixed with the adjustment air and evaporates, the aerosol particle size can be decreased to the equilibrium particle size. After that, the aerosol gets exhausted from the mixing chamber cavity through the aerosol outlet and enter the aerosol particle size screening module. Meanwhile, according to a physical quantity measured by the system and formula calculation results, a temperature and a humidity of the adjustment air can be controlled, thereby controlling a temperature and a humidity of an air flow from the outlet of the mixing chamber.

The mixing chamber cavity is designed based on an aerosol evaporation model and is a long cylinder. Under the working condition of the present invention, the mixing chamber cavity has a length of 0.8 μm, a diameter of 0.06 μm, a wall thickness of 0.02 μm, and air flow time of 3-4 s. Thus, the aerosol evaporates adequately with the particle size decreased to the equilibrium particle size. With the mixing chamber cavity, the pathogen-laden aerosol keeps a stable physical state in subsequent steps like particle size screening and recipient exposure. The mixing chamber solves a problem that due to insufficient mixing of the supplemented air with the saturated aerosol, the aerosol evaporates while moving, causing the temperature and the humidity changes and affecting pathogen activity.

The aerosol can enter the aerosol sampling system through the sampling port for aerosol particle size and viral activity analysis and measurement. Thus, the effect of air temperature and humidity on the distribution of aerosol particle size and quantity and the inactivation rate of the pathogen carried can be studied.

The donor animal chamber has a size of 55 cm×36 cm×38 cm. An upper box cover is connected with the box through eight buckle latches to facilitate the entry and exit of experimental animals and experimental equipment. The aerosol can enter the aerosol sampling system through the sampling port for aerosol particle size and viral activity analysis. The transparent glass window has a size of 30.2 cm×21.1 cm and is double-glazed. A space between glass layers is vacuumized to reduce heat loss and facilitate observation on a state of the experimental animal. The wire cage has a size of 45 cm×36 cm×30 cm, and is provided with the feeding water bottle and the trough. The wire cage is used for long-term animal feeding, animal exposure experiments, and convenient to take and place animals. The wire cage is raised by the wire cage stand and is 2 cm above the bottom of the chamber. This is convenient for animal excrement to fall from the cage, keeps the animal feeding environment clean, and prevent the experimental animal from eating the excrement. The monitoring camera can record activities and behaviors of the experimental animal in real time to facilitate experimental research on the transmission route. The tube bulb is turned on or off as required, so as to simulate daytime and nighttime and ensure regular rest of the experimental animal.

For the experimental research on airborne transmission, the clean adjustment air with the specified temperature, humidity and flow enters the donor animal chamber through the adjustment air inlet, and flows into the aerosol particle size screening module through the aerosol outlet together with the pathogen-laden aerosol generated by the infected animal.

For the experimental research on droplet transmission and airborne transmission, the double-layer iron wire gauze is inserted into the middle of the wire cage to separate the wire cage into two small chambers. For fear of contact transmission, the infected donor animal is fed in a left chamber, while the healthy recipient animal is fed in a right chamber. The clean adjustment air with the specified temperature, humidity and flow enters the donor animal chamber through the adjustment air inlet, and is exhausted through the aerosol outlet.

For the experimental research on droplet transmission, airborne transmission and contact transmission, the double-layer iron wire gauze is pulled out, and the recipient animal and the donor animal are collectively fed in the donor animal chamber. The clean adjustment air with the specified temperature, humidity and flow enters the donor animal chamber through the adjustment air inlet, and is exhausted through the aerosol outlet.

For the experimental research on contact transmission, the donor animal is fed in the wire cage for a period of time, with excrements distributed at the bottom of the chamber. Then the wire cage is pulled out, and the recipient animal is placed into the wire cage for feeding, so that the recipient animal makes in contact with the excrements of the donor animal. The clean adjustment air with the specified temperature, humidity and flow enters the donor animal chamber through the adjustment air inlet, and is exhausted through the aerosol outlet.

The main function of the impactor is to screen the aerosol. With inertance of aerosol particles, the impactor can collect and obstruct aerosol particles with a particle size larger than a cutoff size, and allow particles with a particle size smaller than the cutoff size to pass through, thereby realizing an aerosol particle size screening function of the present invention. By changing a pore plate, the impactor can screen different particle sizes. The cutoff size includes 10 μm, 2.5 μm and 1.0 μm.

The impactor stand is used to fix the relative height between the impactor and the donor animal chamber and the recipient animal chamber to prevent aerosol deposition caused by excessive bending of the tube.

The recipient animal chamber is used to feed the recipient animal in the experimental research on the airborne transmission. Design of the transparent glass window, the aerosol inlet, the buckle latch, the wire cage stand, the wire cage, the feeding water bottle, the trough and the sampling port of the recipient animal chamber are the same as the donor animal chamber.

The fan ensures that the aerosol entering the recipient animal chamber is fully mixed with air inside, counterbalancing the rising heat plume caused by the experimental animal, and ensuring a uniform distribution of the aerosol. The fan has a wind speed of 0.4 m/s. After the healthy animal is fully exposed, the air flows out through the exhaust air outlet and is filtered through the high-efficiency filter into the atmosphere. The flow rate of the pump is slightly greater than 30 L/min, so that a micro-negative pressure environment is formed in the recipient animal chamber to prevent biological pollution.

The recipient animal chamber may be used to feed the recipient animal, and may also be used to place the anaesthetized recipient animal. This provides adequate exposure to aerosols while preventing the recipient animal from coming into contact with aerosol-contaminated fur or contaminating its own excrement, which can lead to contact transmission.

When the aerosol sampling system is not sampling, the sampling analyzer can be separated from other systems through the stop valve. The aerosol sampling system performs sampling using the cascade impactor sampling method, the liquid impactor sampling method or the membrane sampling method.

The temperature and humidity adjustment range of the constant temperature and humidity air producing device is 0-120° C., 5-95% RH. This device can realize accurate temperature and humidity adjustment and control. The constant temperature and humidity air producing device is provided with a heating component, a cooling component, a humidification component and a dehumidification component, and can provide a clean air flow with a fixed temperature, humidity and flow. During the experiment, it is necessary to detect temperature and humidity fluctuations to ensure that a temperature and a humidity of the air produced in the device can be kept in an accurate range required by a preset value. During the test (temperature and humidity data are collected every 10 s), the temperature has a fluctuating value within 0.5° C., and the relative humidity fluctuation is small. Thus, the constant temperature and humidity air producing device provided with the heating component, the cooling component, the humidification component and the dehumidification component can provide an adjustment air flow with a stable temperature and humidity.

Temperature-humidity sensors are arranged inside the mixing chamber cavity, the recipient animal chamber and other key components, and the temperature and humidity information is transmitted to the computer in real time for centralized processing and feedback, monitoring a temperature and a humidity of an air flow in the experiment. The computer feeds back temperature and humidity change information, and the constant temperature and humidity air producing device adjusts a preset value of temperature and humidity in the air flow, controls the temperature and the humidity of the air flow, and fully considers evaporation in the aerosol generation device and the donor animal chamber to obtain a stable aerosol with a corresponding temperature and humidity. This ensures that the pathogen-laden aerosol keeps a stable physical state in subsequent particle size screening, recipient exposure and other processes, and that the temperature and humidity of the air flow inside the experimental device is controllable.

The high-efficiency filter in the temperature-humidity control system is a membrane filter. It can block particles with a diameter bigger than or equal to 0.3 μm with filtration efficiency ≥95%. Various microbes in the air may be attached to the aerosol, so the air needs to be filtered to prevent interfering the experimental system.

The tube at the outlet of the constant temperature and humidity air producing device is wrapped by a tube insulating layer. The tube insulating layer is made of an insulating pearl cotton. This can reduce a heat loss of the tube, and ensure constant temperature and humidity of the adjustment air.

Foam is set in an upper box cover of each of the donor chamber and the recipient chamber. The foam provides a better sealing connection between the upper box cover and the box, and a sealing tape is used between the tubes and each system.

The mixing chamber, the donor animal chamber, the aerosol particle size screening module and the recipient animal chamber are set in the insulating layer of the environmental temperature compensation system. The temperature control range of the insulating box is 0-120° C. The insulating box can compensate an external environment temperature, quickly cools the key system to a specified temperature zone before the experiment, and prevents the external environment temperature from affecting the temperature of the experimental system during the experiment. The transparent glass window of the insulating box is double-glazed. A space between glass layers is vacuumized to reduce a heat loss and facilitate observation on a state of the experimental animal. The electric heating wire and the phase-change material are set in the insulating box. When the external temperature is too low and the heat needs to be compensated, the electric heating wire will be started to heat the internal system to specified temperature; when the external temperature is too high and the cooling capacity needs to be compensated, phase change materials will be put in to cool the internal system to specified temperature. The mixing fan is set near the electric heating wire and the phase-change material to create a forced convection environment during the temperature compensation process, and ensure that the temperature field inside the insulating box reaches a uniform state in a short time. The environmental temperature compensation system is connected with the computer to ensure accurate temperature and humidity control and accurate ambient temperature compensation.

The insulating box and the aerosol generation module are set in the biosafety cabinet. The air flow tube of each of the air flow temperature-humidity control system, the aerosol generation module and the recipient animal chamber gets in and out through the tube port to ensure a biosafety of the experiment. All experimental devices are disinfected with disinfectant before and after the experiment.

For the experiment on the airborne transmission, there are two sources to provide the aerosol. First, the aerosol generated by the aerosol generation device in the aerosol generation module and the constant temperature and humidity air produced by the constant temperature and humidity air producing device in the temperature-humidity control system are mixed in the mixing chamber cavity to form the aerosol with the specified concentration and temperature. Second, the constant temperature and humidity air produced by the constant temperature and humidity air producing device enters the donor animal chamber to mix with the aerosol generated by the donor animal, thereby forming the aerosol with the specified concentration and temperature. In the aerosol particle size screening module, the aerosol is screened to form the aerosol with the fixed particle size range. The aerosol enters the recipient animal chamber to perform the aerosol exposure experiment on the healthy animal. The aerosol sampling system analyzes and calibrates aerosol particle size and activity and concentration of virus in the aerosol in the mixing chamber, the donor animal chamber and the recipient animal chamber before and after the experiment.

According to the present disclosure, exposure experiments about other transmission routes can be performed using the donor animal chamber alone. The donor animal and the recipient animal are fed in the donor animal chamber and separated by the double-layer iron wire gauze, thereby realizing the droplet transmission experiment and the airborne transmission experiment. The donor animal and the recipient animal are fed in the donor animal chamber, thereby realizing the droplet transmission experiment, the airborne transmission experiment and the contact transmission experiment. The donor animal is fed in the donor animal chamber for a period of time, and the wire cage and the donor animal are removed, and then the recipient animal is placed into the donor animal chamber, thereby realizing the contact transmission experiment. Therefore, the present invention can realize multiple transmission routes for in-depth study of pathogenic process and transmission routes of infectious diseases.

The present invention generates an aerosol with a certain particle size-quantity distribution through the standard aerosol generation device or the infected animal, and performs particle size screening on the generated aerosol with the impactor, realizing exposure and infection to the recipient animal with aerosols of different sources, different concentrations and different particle sizes under specified temperature and humidity conditions, and realizing quantitative calibration and evaluation on infectivity of the aerosol with a special particle size range. Through a structural design of the donor animal chamber, the combined research of droplet transmission, airborne transmission and contact transmission is realized. With the constant temperature and humidity air producing device, the temperature-humidity sensor, the computer for controlling the temperature and humidity of the air flow in the device, and the insulating box for compensating the external temperature, the present invention realizes temperature-humidity monitoring, air adjustment and control inside and outside the experimental device.

The present invention can maintain a constant temperature and humidity (0-120° C., 5%-95% RH) in the experiment to study the influence of environmental parameters on an activity and a transmission risk of a pathogen. The present invention can form aerosols of different concentrations and different particle sizes to perform the aerosol exposure experiment on the animal, and can also perform the direct contact transmission experiment and the surface contact transmission experiment on the animal, realizing quantitative research on the transmission risk in various exposure modes.

The present invention has the following beneficial effects:

1. The present invention has the automatic and fine air flow temperature and humidity control system and environmental temperature compensation system. The temperature-humidity sensor is arranged inside the mixing chamber cavity, the recipient animal chamber and other key components, and the temperature and humidity information is transmitted to the computer for intensive processing and feedback. The sensor monitors the temperature and humidity of the air flow in the experiment in real time, automatically adjusts the temperature and humidity of the output air through the constant temperature and humidity air producing device, and make prompt feedback. The interior of the insulating box is equipped with the electric heating wire, the phase-change material and the mixing fan, which can be quickly preheated or pre-cooled before the experiment, and realizes temperature compensation with the temperature-humidity control system in the experiment.

2. The present invention can realize the quantitative aerosol exposure experiment and accurately control the concentration and particle size of the aerosol. The aerosol is generated by the atomizer or the animal, and the aerosols of different concentrations and sizes are formed through temperature and humidity control and particle size screening. These aerosols are used to perform exposure and infection on the recipient animal, thereby realizing quantitative calibration and evaluation on the infectivity of the aerosol of special particle size range. This facilitates in-depth research on the mechanism of infection and spread of pathogen-laden aerosols.

3. The present invention can realize combined experimental research on the airborne transmission, droplet transmission, contact transmission, etc. By designing the structure of the donor animal chamber, multiple transmission routes between the donor animal and the recipient animal can be realized. This facilitates in-depth research on the transmission mechanism and the pathogenic process of the pathogen.

4. The present invention can ensure biosafety. The inlet and outlet of the experimental device each are equipped with the high-efficiency filter. The exhaust air flow is slightly larger than the flow at the inlet so that a micro-negative pressure environment is formed in the experimental device to prevent leakage of the pathogen-laden air. Key devices are placed in the biosafety cabinet, and the devices are disinfected before and after the experiment.

5. The present invention is suitable for exposure experiments of various experimental animals. The recipient animal chamber is large, which can be used for exposure experiments of small and medium-sized experimental animals such as hamsters, rats and ferrets, which are suitable for classical infectious disease research. Thus, the present invention has universal applicability.

In the figures: 11: aerosol generation module, 111: first pump, 112: first flowmeter, 113: first filter, 114: aerosol generation device, 12: mixing chamber, 121: first adjustment air inlet, 122: first aerosol inlet, 123: first sampling port, 124: mixing chamber cavity, 125: first aerosol outlet, 126: first sensor, 127: second sampling port, 13: donor animal chamber, 131: second adjustment air inlet, 132: first feeding water bottle, 133: first buckle latch, 134: second sensor, 135: third sampling port, 136: second aerosol outlet, 137: first glass window, 138: first trough, 14: aerosol particle size screening module, 141: first stop valve, 142: impactor, 143: impactor stand, 15: recipient animal chamber, 151: second glass window, 152: second wire cage, 153: second aerosol inlet, 154: second buckle latch, 155: fan, 156: third sensor, 157: fourth sampling port, 158: third feeding water bottle, 159: third trough, 1510: exhaust air outlet, 1511: second wire cage stand, 1512: second filter, 1513: second pump, 21: contact avoidance module, 211: first wire cage stand, 212: first wire cage, 213: double-layer iron wire gauze, 22: animal feeding module, 221: second feeding water bottle, 222: second trough, 23: animal behavior observation module, 231: tube bulb, 232: monitoring camera, 3: aerosol sampling system, 311: second stop valve, 312: sampling analyzer, 313: third filter, 314: third pump, 4: air flow temperature-humidity control system, 411: membrane dryer, 412: constant temperature and humidity air producing device, 413: second flowmeter, 414: fourth filter, 415: computer, 5: environmental temperature compensation system, 511: insulating layer, 512: phase-change material, 513: electric heating wire, 514: mixing fan, 515: third glass window, 6: biosafety system, 611: biosafety cabinet cavity, and 612: tube port.

DETAILED DESCRIPTION OF THE EMBODIMENTS

The present invention will be further described below in combination with the accompanying drawings and embodiments.

Figure 1:
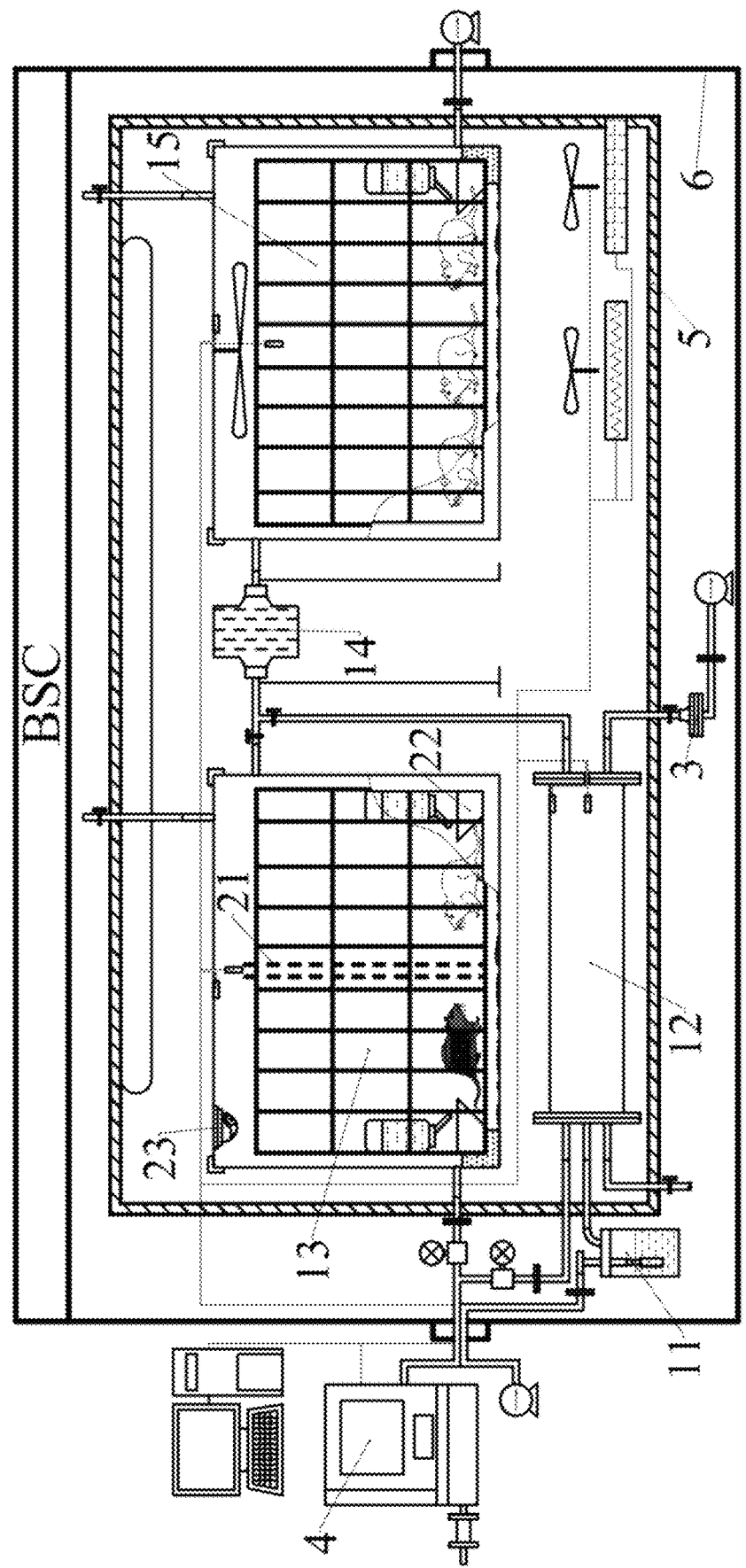
FIG. 1 is a schematic view of a device according to the present invention.

As shown in FIG. 1, the present invention provides a multifunctional animal exposure experimental device, including an aerosol exposure system, a multi-route transmission system, aerosol sampling system 3, air flow temperature-humidity control system 4, environmental temperature compensation system 5, and biosafety system 6. The multi-route transmission system is provided in the aerosol exposure system. The aerosol sampling system 3 and the air flow temperature-humidity control system 4 are connected to the aerosol exposure system. The environmental temperature compensation system 5 is provided in the biosafety system 6.

The aerosol exposure system includes aerosol generation module 11, mixing chamber 12, donor animal chamber 13, aerosol particle size screening module 14, and recipient animal chamber 15. An output end of the aerosol generation module 11 communicates with the mixing chamber 12 through a tube. The mixing chamber 12 and the donor animal chamber 13 communicate with the recipient animal chamber 15 through the aerosol particle size screening module 14.

Figure 2:
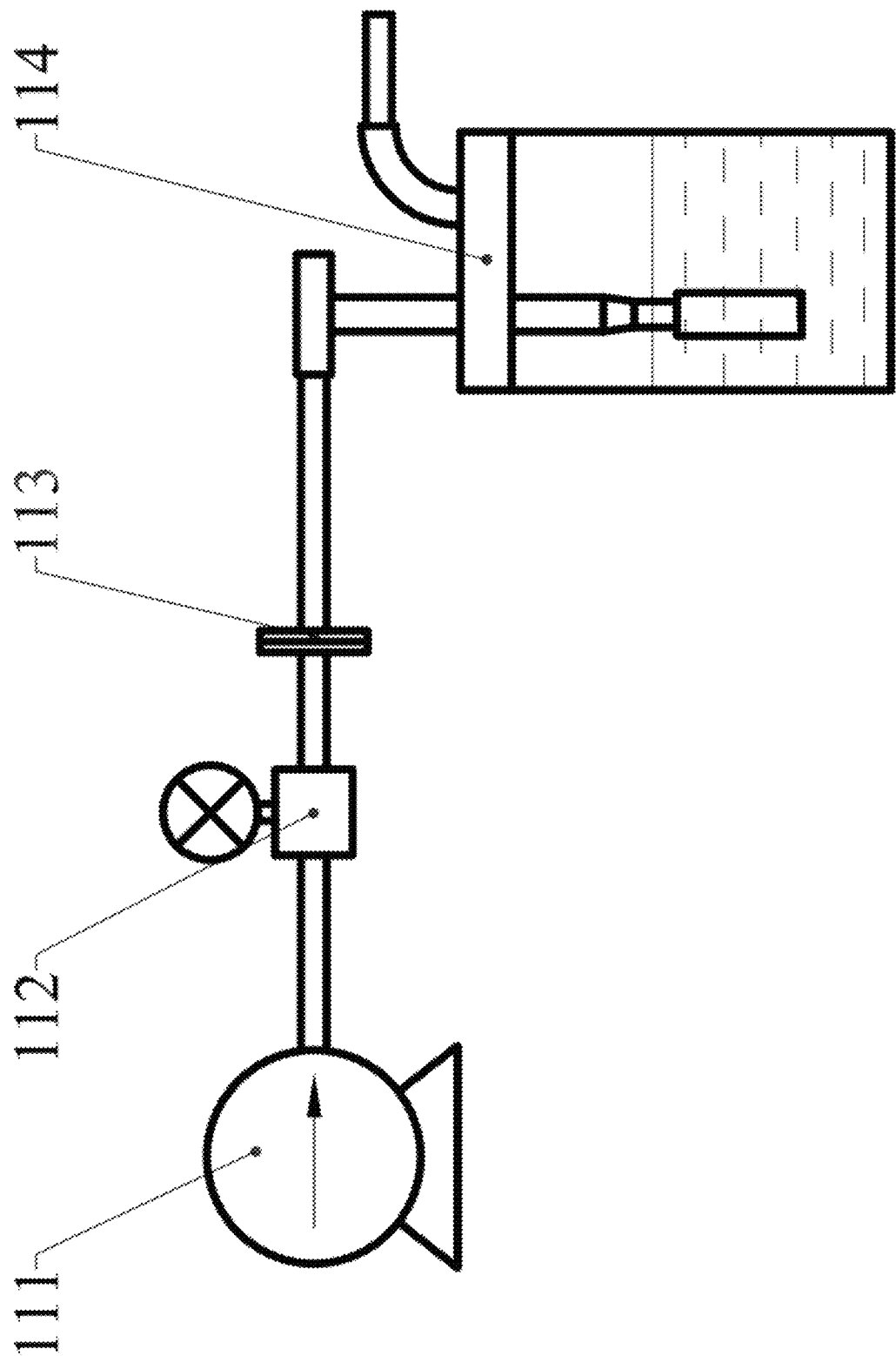
FIG. 2 is a schematic view of an aerosol generation module.

As shown in FIG. 2, the aerosol generation module 11 includes first pump 111 and aerosol generation device 114. An output end of the first pump 111 is connected to an input end of the aerosol generation device 114 through a tube. The tube from the first pump 111 to the aerosol generation device 114 is sequentially provided with first flowmeter 112 and first filter 113. An output end of the aerosol generation device 114 is connected to the mixing chamber 12. The first pump 111 provides compressed air for the aerosol generation device 114. The first flowmeter 112 effectively controls an air flow entering the aerosol generation device 114. The aerosol generation device 114 is an atomizer, generating a saturated aerosol which enters the mixing chamber 12.

Figure 3:
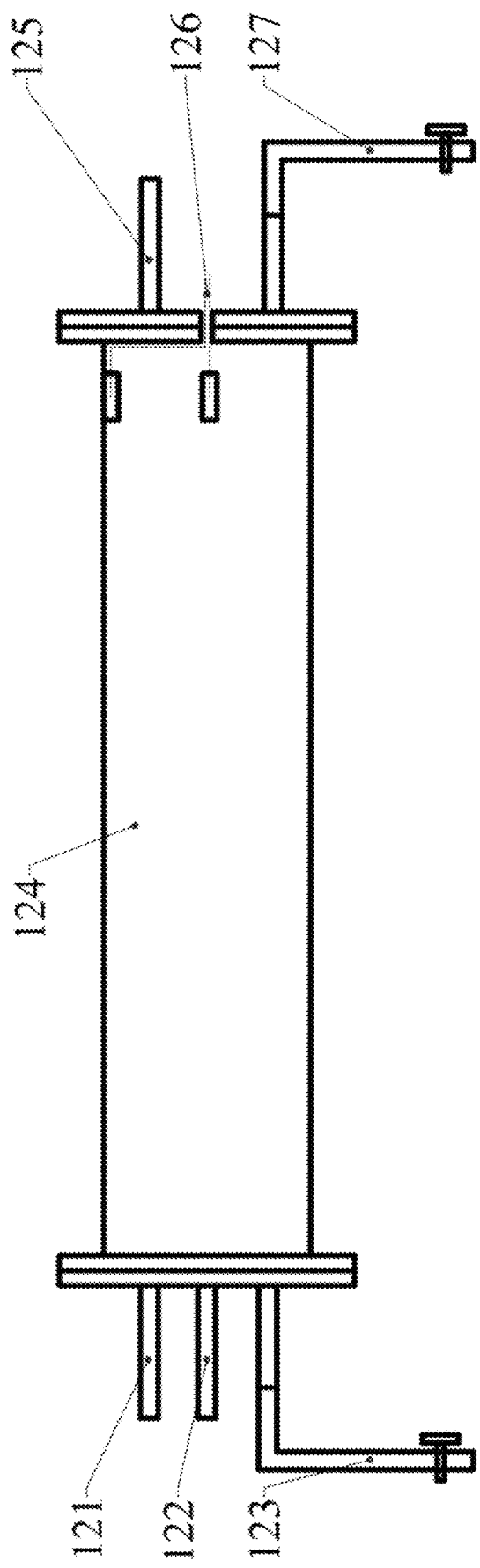
FIG. 3 is a schematic view of a mixing chamber.

As shown in FIG. 3, the mixing chamber 12 includes mixing chamber cavity 124. First adjustment air inlet 121, first aerosol inlet 122 and first sampling port 123 are formed at one side of the mixing chamber cavity 124. The first adjustment air inlet 121 is connected to the air flow temperature-humidity control system 4 through a tube. The first aerosol inlet 122 is connected to the output end of the aerosol generation device 114 through a tube. First aerosol outlet 125 and second sampling port 127 are set at the other side of the mixing chamber cavity 124. The first aerosol outlet 125 is connected to the aerosol particle size screening module 14 through a tube. The first sampling port 123 and the second sampling port 127 at two sides of the mixing chamber cavity 124 respectively communicate with two aerosol sampling systems 3. The other side of the mixing chamber cavity 124 provided with the first aerosol outlet 125 is further provided with first sensor 126. The first sensor 126 is electrically connected to the air flow temperature-humidity control system 4. The mixing chamber 12 is configured to adjust the saturated aerosol to a specified concentration and temperature. End covers at the two sides of the mixing chamber cavity 124 are connected to a middle cylindrical cavity by bolts for easy disassembly, cleaning and disinfection. The saturated aerosol generated by the aerosol generation device 114 enters the mixing chamber cavity 124 through the first aerosol inlet 122. Adjustment air generated by the constant temperature and humidity air producing device 412 which has specified temperature and humidity enters the mixing chamber cavity 124 through the first adjustment air inlet 121. After the saturated aerosol and the adjustment air get fully mixed in the mixing chamber cavity 124, the saturated aerosol is exhausted from the mixing chamber cavity 124 through the first aerosol outlet 125. The aerosol can enter the aerosol sampling system 3 through the first sampling port 123 for particle size and virus activity analysis. A sensor port for setting the first sensor 126 is formed in the mixing chamber cavity 124. The first sensor 126 is configured to real-time monitor of a temperature and a humidity of an air flow in the mixing chamber cavity 124 as well as a wall temperature of the mixing chamber cavity. The sensor port, the first adjustment air inlet 121, the first aerosol inlet 122, the first sampling port 123 and the first aerosol outlet 122 are insulated and sealed to prevent heat leakage and air leakage.

Figure 4:
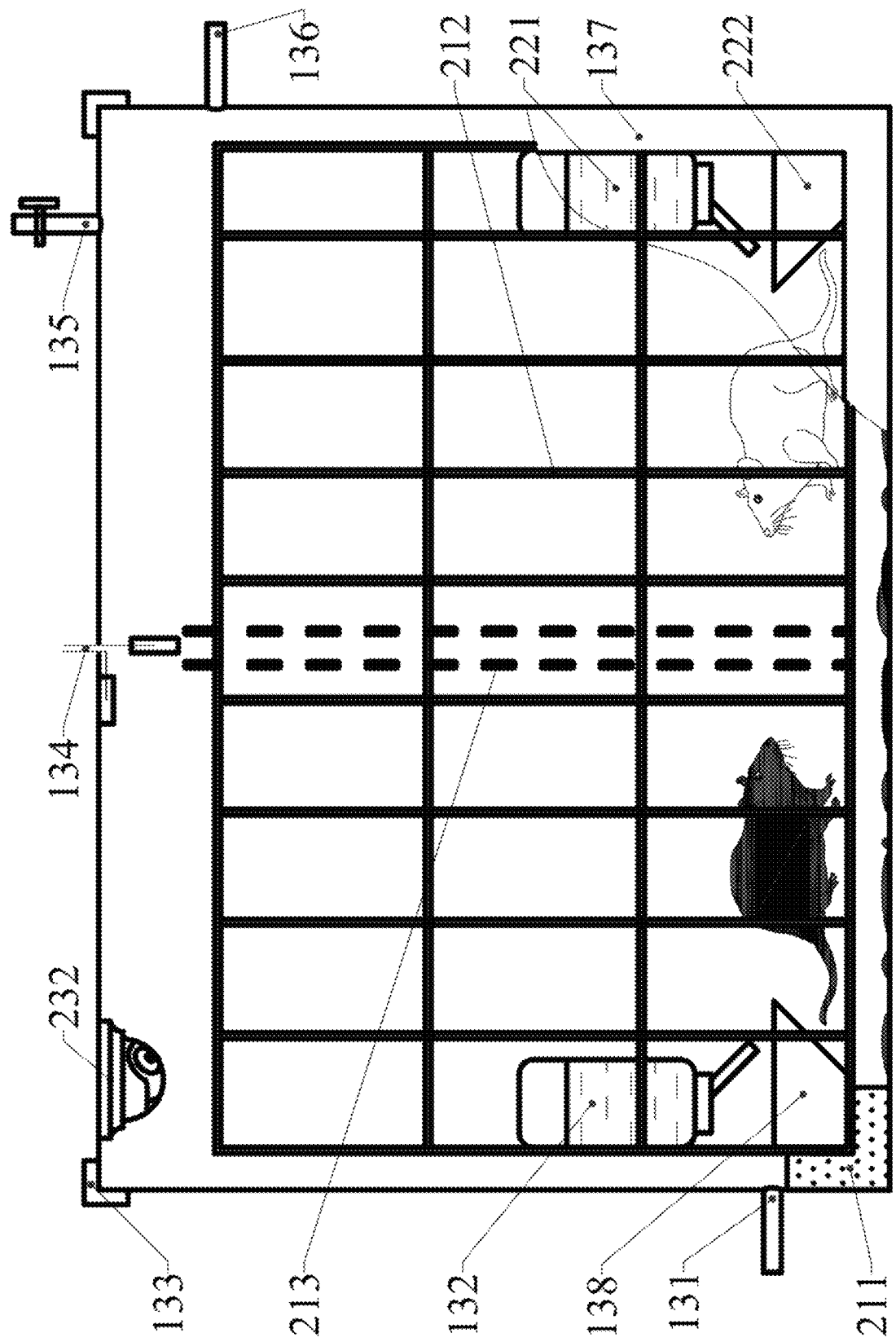
FIG. 4 is a schematic view of a donor animal chamber and a part of a multi-route transmission system.

As shown in FIG. 4, first glass window 137 for observation is formed in a sidewall of the donor animal chamber 13. Second adjustment air inlet 131, second aerosol outlet 136 and third sampling port 135 are respectively located on a lower part, an upper part and a top of the donor animal chamber 13. The second adjustment air inlet 131 is connected to the air flow temperature-humidity control system 4 through a tube. The second aerosol outlet 136 is connected to the aerosol particle size screening module 14 through a tube. The third sampling port 135 communicates with the aerosol sampling system 3. Second sensor 134 is located on the top of the donor animal chamber 13. The second sensor 134 is electrically connected to the air flow temperature-humidity control system 4.

An infected donor animal is fed in the donor animal chamber. The donor animal is configured for generating a pathogen-laden aerosol. The clean adjustment air with the specified temperature and humidity enters the donor animal chamber through the second adjustment air inlet 131, and flows into the aerosol particle size screening module 14 through the second aerosol outlet 136 together with the pathogen-laden aerosol generated by the infected animal. An upper box cover and a box are connected through first buckle latch 133 to ensure airtightness and facilitate the entry and exit of experimental animals and experimental equipment. The aerosol can enter the aerosol sampling system 3 through the third sampling port 135 for aerosol particle size and viral activity analysis. The second sensor 134 monitors a temperature and a humidity of an air flow in the donor animal chamber as well as a wall temperature of the donor animal chamber in real time. The first glass window 137 is double-glazed to reduce a heat loss and facilitate observation on a state of the experimental animal.

Figure 5:
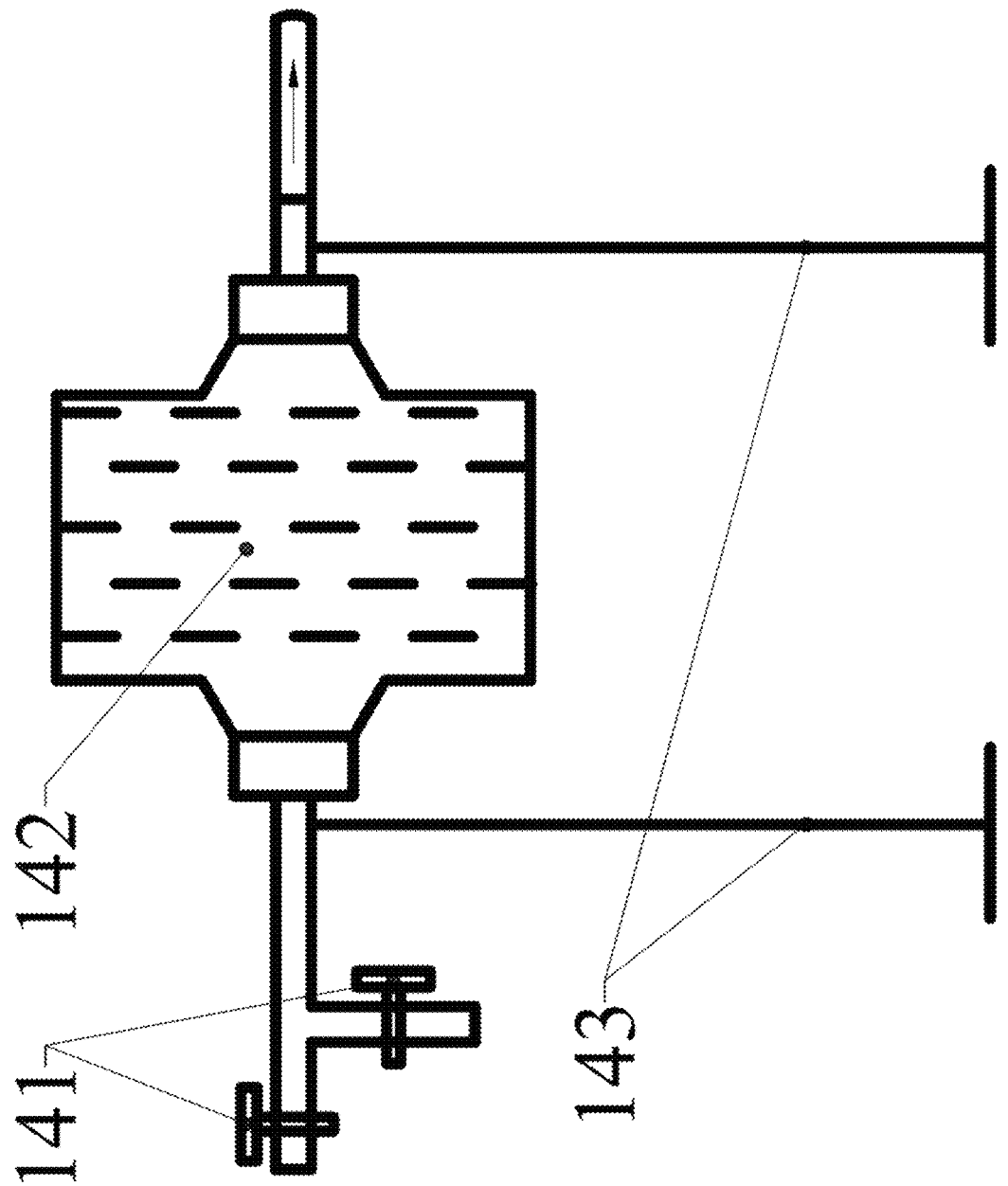
FIG. 5 is a schematic view of an aerosol particle size screening module.

As shown in FIG. 5, the aerosol particle size screening module 14 includes impactor 142 and impactor stand 143. The impactor stand 143 is set on the ground. The impactor 142 is fixed on the impactor stand 143. Ports are respectively formed at two sides of the impactor 142 to serve as an inlet and an outlet of the impactor 142. The inlet of the impactor 142 is connected to the first aerosol outlet 125 of the mixing chamber 12 or the second aerosol outlet 136 of the donor animal chamber 13 through a tube. The tube from the impactor 142 to each of the first aerosol outlet 125 and the second aerosol outlet 136 is provided with first stop valve 141. The outlet of the impactor 142 is connected to the recipient animal chamber 15 through a tube.

The aerosol particle size screening module 14 is configured to screen the aerosol generated by the infected experimental animal in the donor animal chamber 13 or the mixing chamber 12. Only aerosols with a fixed particle size range are allowed to pass through. When the infected animal generates aerosols, the first stop valve 141 can cut off the flow path between the aerosol particle size screening module 14 and the mixing chamber 12. When the mixing chamber 12 generates aerosols, the first stop valve 141 can cut off a flow path between the donor animal chamber 13 and the aerosol particle size screening module 14. The impactor 142 can screen the particle size of the aerosol that passes through, and only an aerosol below a certain particle size is retained into the recipient animal chamber 3. The cutoff size includes 10 μm, 2.5 μm and 1.0 μm.

Figure 6:
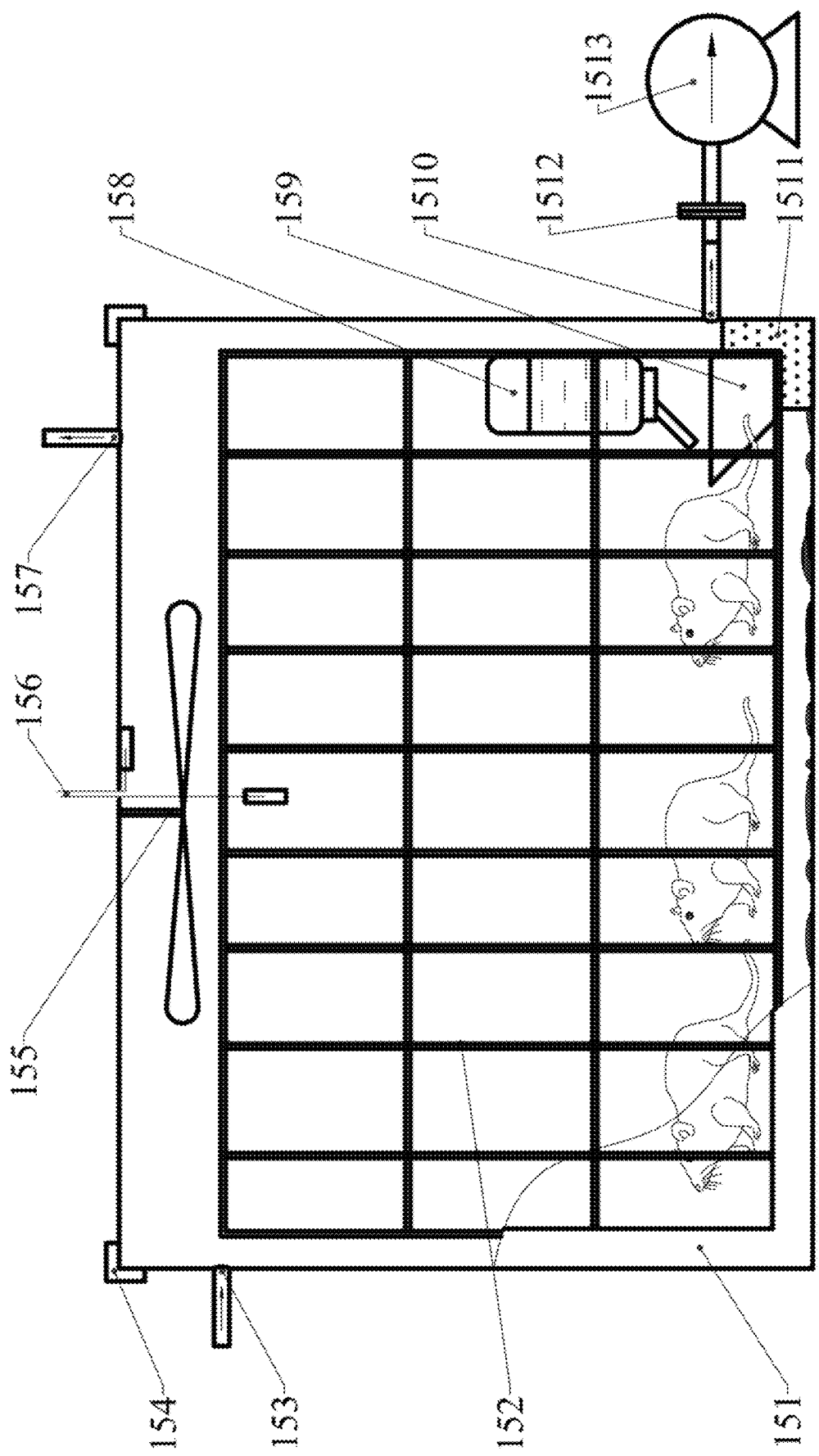
FIG. 6 is a schematic view of a recipient animal chamber.

As shown in FIG. 6, the recipient animal chamber 15 includes fan 155, second wire cage 152, second wire cage stand 1511, third feeding water bottle 158, third trough 159, and second pump 1513. Second glass window 151 for observation is formed in a sidewall of the recipient animal chamber 15. The second wire cage stand 1511 is fixed at a bottom of the recipient animal chamber 15. The second wire cage 152 is located in the recipient animal chamber 15 and set on the second wire cage stand 1511. The third feeding water bottle 158 and the third trough 159 are provided in the second wire cage 152. The fan 155 is provided on a top of a recipient feeding chamber. The second wire cage 152 does not come in contact with the fan 155. Exhaust air outlet 1510, second aerosol inlet 153 and fourth sampling port 157 are respectively located on a lower part, an upper part and a top of the recipient animal chamber 15. The second aerosol inlet 153 is connected to the outlet of the impactor 142 through a tube. The exhaust air outlet 1510 is connected to the second pump 1513 through a tube. The tube from the exhaust air outlet 1510 to the second pump 1513 is provided with second filter 1512. The fourth sampling port 157 communicates with the aerosol sampling system 3. The top of the recipient animal chamber 15 is set with third sensor 156. The third sensor 156 is electrically connected to the air flow temperature-humidity control system 4.

After an aerosol with a fixed particle size range, concentration and temperature enters the recipient animal chamber 15, aerosol exposure can be performed on the healthy experimental animal. The second glass window 151 is double-glazed to reduce a heat loss and facilitate observation on a state of the experimental animal. An upper box cover and a box are connected through second buckle latch 154 to ensure airtightness and facilitate the entry and exit of experimental animals and experimental equipment. The aerosol from the aerosol particle size screening module 14 enters the recipient animal chamber 15 through the second aerosol inlet 153, and is fully mixed with air in the recipient animal chamber 15 through the fan 155, which counterbalances the rising heat plume caused by the experimental animal and ensures a uniform distribution of the aerosol. After the healthy animal is fully exposed, the air flows out through the exhaust air outlet 1510. The aerosol can enter the aerosol sampling system 3 through the fourth sampling port 157 for aerosol particle size and viral activity analysis. The third sensor 156 monitors a temperature and a humidity of an air flow in the recipient animal chamber 15 as well as a wall temperature of the recipient animal chamber 15 in real time. The second wire cage 152 and the second wire cage stand 1511 are used for feeding the animal and prevent interference of pollutant transmission route when conducting the airborne transmission experiment. The second filter 1512 filters exhaust air to prevent biological pollution. An exhaust air flow of the second pump 1513 is slightly larger than an overall flow of the system, so that a negative pressure environment is formed in the recipient animal chamber 15 to prevent the biological pollution.

The multi-route transmission system includes contact avoidance module 21, animal feeding module 22, and animal behavior observation module 23. The contact avoidance module 21 includes first wire cage stand 211, first wire cage 212, and double-layer iron wire gauze 213. The first wire cage stand 211 is fixed at a bottom of the donor animal chamber 13. The first wire cage 212 is located in the donor animal chamber 13 and set on the first wire cage stand 211. The double-layer iron wire gauze 213 is set in a middle of the first wire cage 212, dividing an area in the first wire cage 212 into two parts. The animal feeding module 22 includes second feeding water bottle 221, second trough 222, first feeding water bottle 132, and first trough 138. The first trough 138 and the second trough 222 are respectively provided in the two parts separated by the double-layer iron wire gauze 213. The second feeding water bottle 221 and the first feeding water bottle 132 are also respectively provided in the two parts separated by the double-layer iron wire gauze 213. That is, each part in the first wire cage 212 is provided with one trough and one feeding water bottle. The animal behavior observation module 23 includes monitoring camera 232. The monitoring camera 232 is provided on the top of the donor animal chamber 13.

Figure 7:
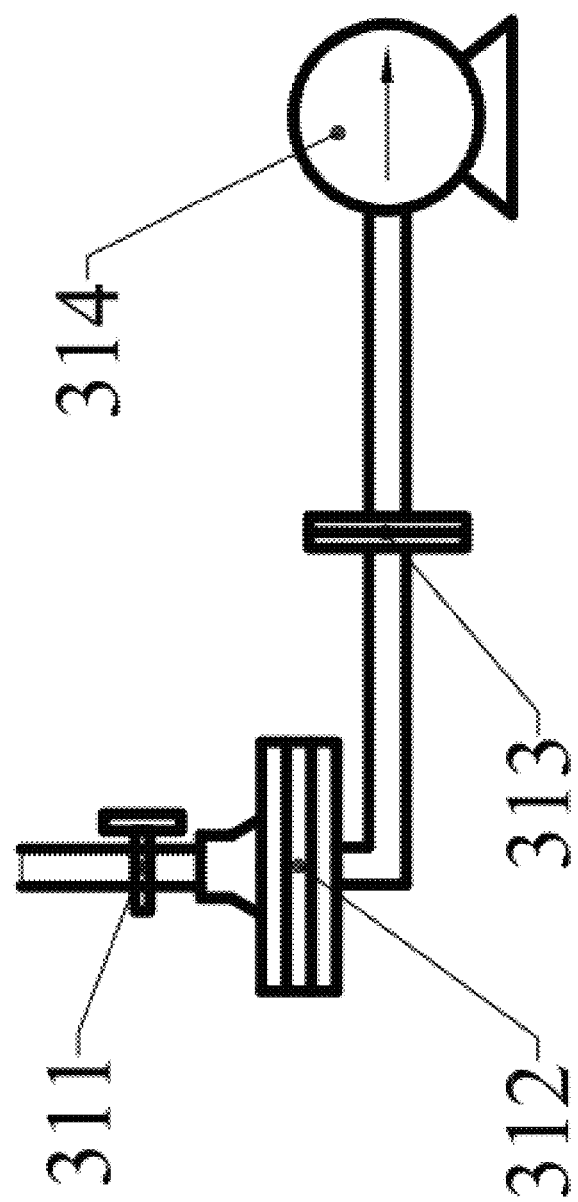
FIG. 7 is a schematic view of an aerosol sampling system.

As shown in FIG. 7, the aerosol sampling system 3 includes sampling analyzer 312 and third pump 314. An output end of the third pump 314 is connected to the first sampling port 123 in the mixing chamber 12, the second sampling port 127 in the mixing chamber 12, the third sampling port 135 in the donor animal chamber 13 and the fourth sampling port 157 in the recipient animal chamber 15 through tubes. The tube from the third pump 314 to each of the first sampling port 123, the second sampling port 127, the third sampling port 135 and the fourth sampling port 157 is sequentially set with second stop valve 311, the sampling analyzer 312 and third filter 313.

The aerosol sampling system 3 can analyze a particle size and a concentration of a pathogen-laden aerosol in the recipient animal chamber 15, the donor animal chamber 13 and the mixing chamber 12. The sampling analyzer 312 can be separated from other systems through the second stop valve 311 when the sampling process is not being performed. The sampling analyzer 312 includes a particle size analyzer and a sampler. Before the experiment, the particle size analyzer is used to analyze the aerosol particle size of the mixing chamber 12, the donor animal chamber 13 or the recipient animal chamber 15, recording and verifying a particle size-quantity distribution of an aerosol generated by the donor animal or the mixing chamber 12 as well as a particle size-quantity distribution of an aerosol in a space after particle size screening. Adjustment and calibration are performed according to a quantified result. Then, the sampler is used to analyze an aerosol concentration at each measuring point mentioned above, record and verify an aerosol concentration generated by the donor animal or the mixing chamber 12, as well as an aerosol concentration in the space after the particle size screening and the inactivation of the pathogen. Adjustment and calibration are performed according to a quantified result. During the experiment, the sampler is used to analyze a concentration of an aerosol in the mixing chamber 12 or the donor animal chamber 13 and the recipient animal chamber 15, and detect an experimental effect. The particle size analyzer is used to check a particle size-quantity distribution of viruses in the recipient animal chamber 15. When sampling is required in the experiment, the aerosol sampling system 3 is placed outside the insulating layer 511 of the environment-temperature compensation system 5, and inside the biosafety cabinet cavity 611 of the biosafety system 6 to ensure a biosafety and prevent the failure of temperature compensation caused by frequent opening and closing of the insulating layer.

Figure 8:
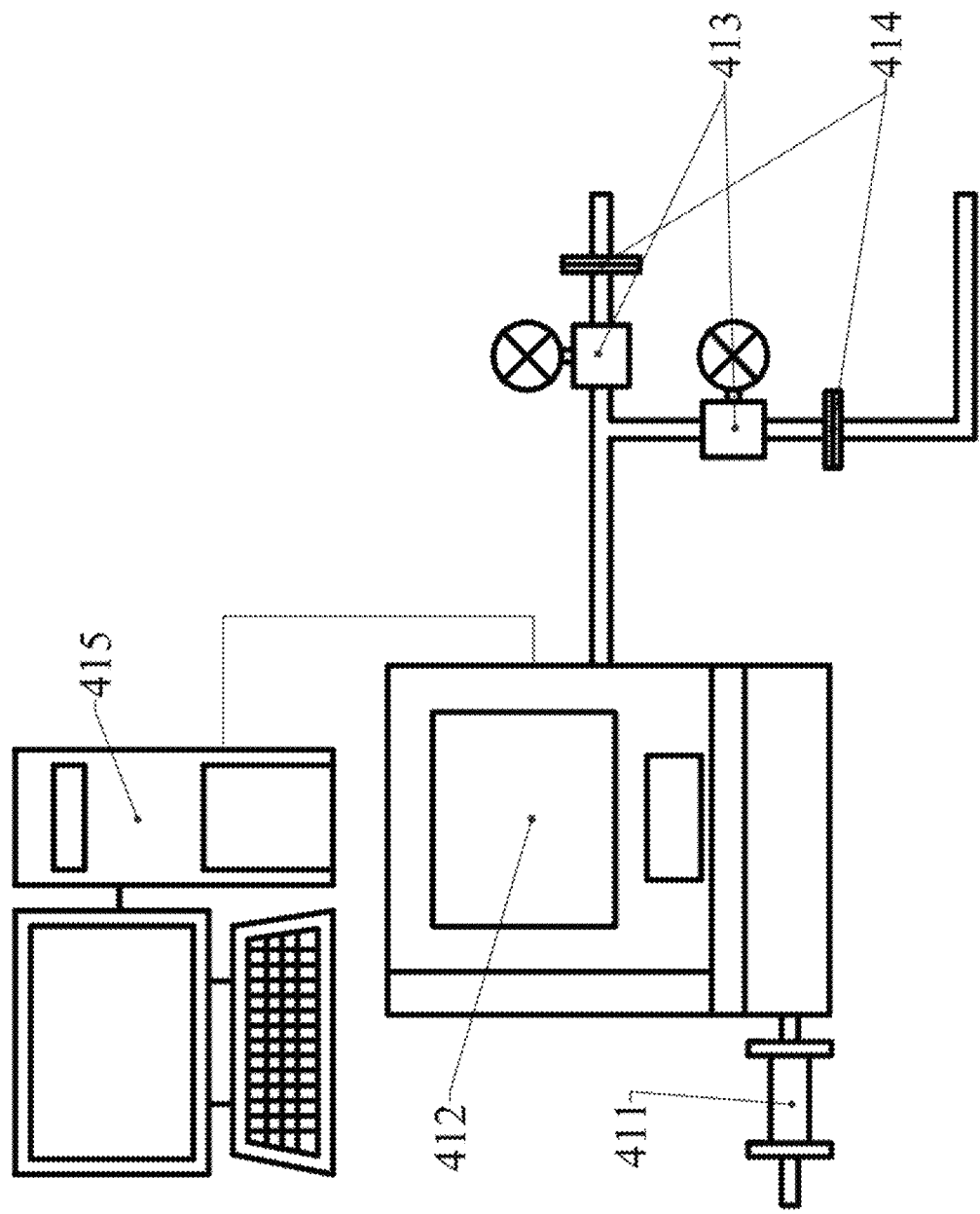
FIG. 8 is a schematic view of an air flow temperature-humidity control system.

As shown in FIG. 8, the air flow temperature-humidity control system 4 includes membrane dryer 411, constant temperature and humidity air producing device 412, and computer 415. The membrane dryer 411 includes an inlet communicating with an outside atmosphere, and an outlet communicating an inlet of the constant temperature and humidity air producing device 412 through a tube. An outlet of the constant temperature and humidity air producing device 412 communicates with the first adjustment air inlet 121 of the mixing chamber 12 or the second adjustment air inlet 131 of the donor animal chamber 13 through a tube. The tube from the constant temperature and humidity air producing device 412 to each of the first adjustment air inlet 121 and the second adjustment air inlet 131 is sequentially provided with second flowmeter 413 and fourth filter 414. An insulating layer is set at the outside of a tube at the outlet of the constant temperature and humidity air producing device 412. The constant temperature and humidity air producing device 412, the first sensor 126, the second sensor 134 and the third sensor 156 are electrically connected to the computer 415.

The first sensor 126, the second sensor 134 and the third sensor 35 are all temperature-humidity sensor. The first filter 113, the second filter 1512, the third filter 313 and the fourth filter 414 are all high-efficiency filter.

The air flow temperature-humidity control system 4 can accurately detect and control the ambient temperature and humidity, wall temperature and internal air temperature and humidity of the device. The membrane dryer 411 and the constant temperature and humidity air producing device 412 are configured to produce clean adjustment air with a specified temperature and humidity. The membrane dryer 411 dries the compressed air, while the constant temperature and humidity air producing device 412 treats the air into the specified temperature and humidity. The tube at the outlet of the constant temperature and humidity air producing device 412 is provided with the insulating layer to keep the temperature and the humidity of the air. The second flowmeter 413 controls the switch and a flow of the two flow paths. The temperature-humidity sensor measures a temperature and a humidity of an inner wall surface of the system as well as a temperature and a humidity of the air mixture, and the computer 415 provides real-time temperature and humidity information feedback. The computer 415 adjusts a temperature and a humidity of the constant temperature and humidity experimental box as well as the aerosol generation device 114 in real time according to the temperature and humidity information, realizing closed-loop temperature and humidity control and reducing the temperature and humidity fluctuation.

Figure 9:
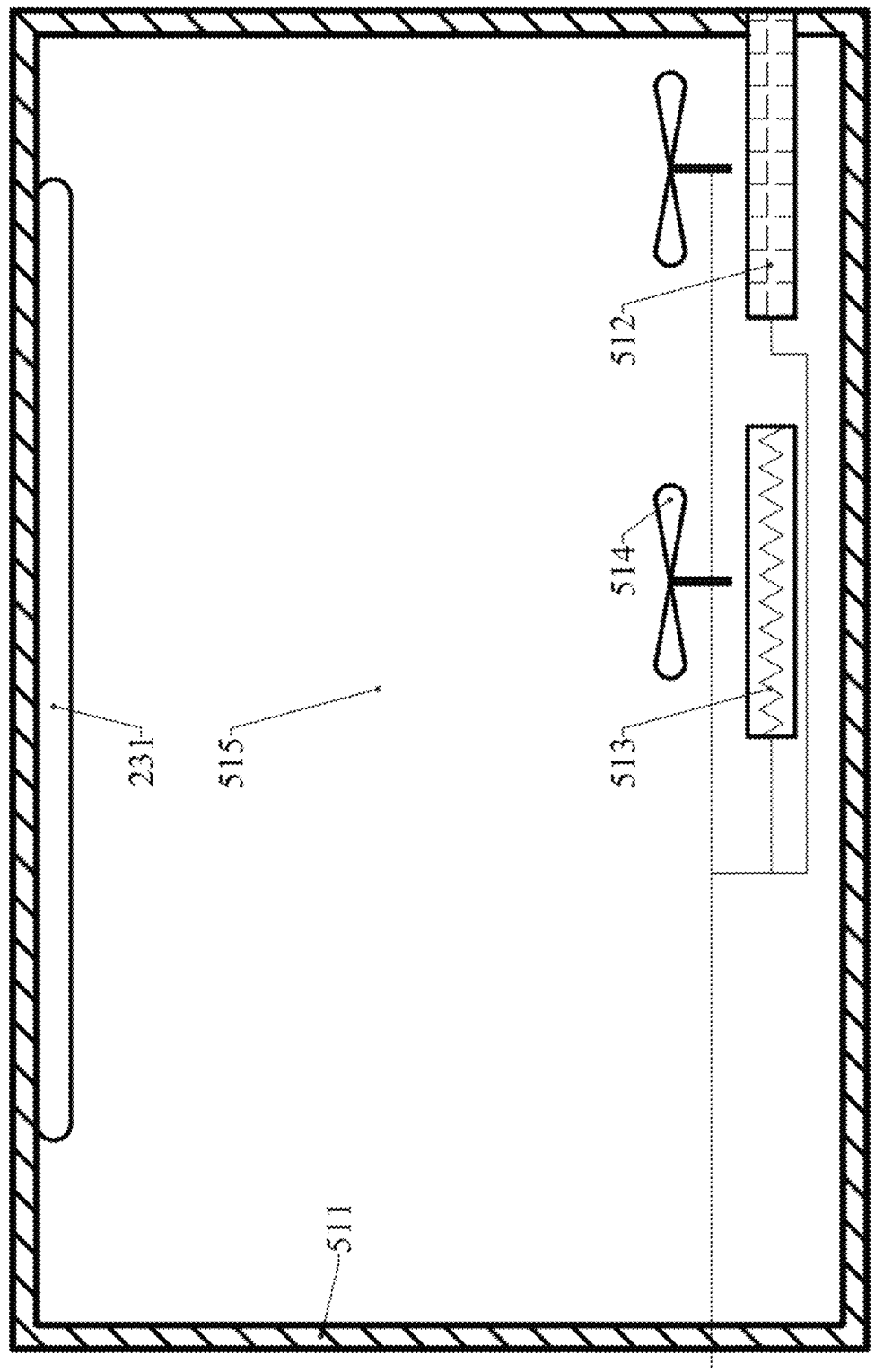
FIG. 9 is a schematic view of an environmental temperature compensation system.

As shown in FIG. 9, the environmental temperature compensation system 5 includes insulating layer 511, phase-change material 512, electric heating wire 513, mixing fan 514, and third glass window 515. The phase-change material 512, the electric heating wire 513 and the mixing fan 514 are set at a bottom of the insulating layer 511. Tube bulb 231 is set at a top of the insulating layer 511. The third glass window 515 is formed in a sidewall of the insulating layer 511. The mixing chamber 12, the donor animal chamber 13, the aerosol particle size screening module 14, the recipient animal chamber 15 and the multi-route transmission system 2 are set in the insulating layer 511. The phase-change material 512, the electric heating wire 513 and the mixing fan 514 are electrically connected to the computer 415.

The environmental temperature compensation system and the temperature-humidity control system collectively form a temperature control system of the device. The temperature control system is configured to control an external environment temperature of the device during the experiment.

Figure 10:
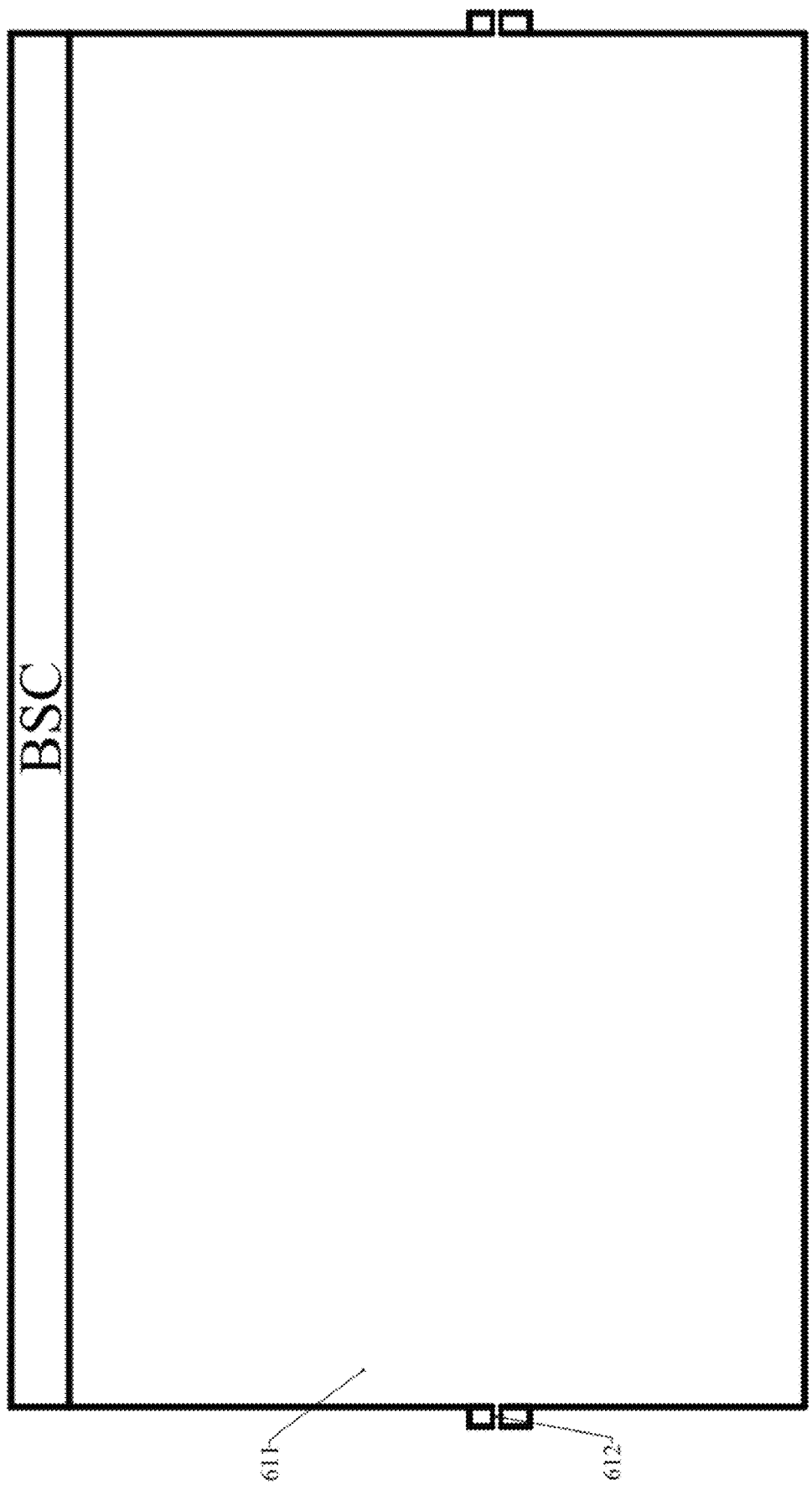
FIG. 10 is a schematic view of a biosafety system.

As shown in FIG. 10, the biosafety system 6 includes biosafety cabinet cavity 611 and tube port 612. The tube port 612 is formed in a sidewall of the biosafety cabinet cavity 611. The mixing chamber 12, the donor animal chamber 13, the aerosol particle size screening module 14, the recipient animal chamber 15, the multi-route transmission system 2, the aerosol sampling system 3 and the environmental temperature compensation system 5 are set in the biosafety cabinet cavity 611.

The aerosol sampling system 3 performs sampling using a cascade impactor sampling method, a liquid impactor sampling method or a membrane sampling method.

What is claimed is:

1. A multifunctional animal exposure experimental device, comprising:

an aerosol exposure system, a multi-route transmission system, an aerosol sampling system, an air flow temperature-humidity control system, an environmental temperature compensation system, and a biosafety system, wherein the multi-route transmission system is provided in the aerosol exposure system; the aerosol sampling system and the air flow temperature-humidity control system are connected to the aerosol exposure system; and the environmental temperature compensation system is provided in the biosafety system;

wherein the aerosol exposure system comprises an aerosol generation module, a mixing chamber, a donor animal chamber, an aerosol particle size screening module, and a recipient animal chamber; an output end of the aerosol generation module communicates with the mixing chamber through a tube; and the mixing chamber and the donor animal chamber communicate with the recipient animal chamber through the aerosol particle size screening module;

wherein the multi-route transmission system comprises a contact avoidance module, an animal feeding module, and an animal behavior observation module; the contact avoidance module comprises a first wire cage stand, a first wire cage, and a double-layer iron wire gauze; the first wire cage stand is fixed at a bottom of the donor animal chamber; the first wire cage is located in the donor animal chamber and set on the first wire cage stand: the double-layer iron wire gauze is set in a middle of the first wire cage, dividing an area in the first wire cage into two parts; the animal feeding module comprises a first feeding water bottle, a first trough, a second feeding water bottle, and a second trough; the first trough and the second trough are respectively provided in the two parts separated by the double-layer iron wire gauze; the second feeding water bottle and the first feeding water bottle are respectively provided in the two parts separated by the double-layer iron wire gauze; the animal behavior observation module comprises a monitoring camera; and the monitoring camera is provided on a top of the donor animal chamber;

the aerosol generation module comprises a first pump and an aerosol generation device; an output end of the first pump is connected to an input end of the aerosol generation device through a tube; the tube from the first pump to the aerosol generation device is sequentially provided with a first flowmeter and a first filter; and an output end of the aerosol generation device is connected to the mixing chamber;

the mixing chamber comprises a mixing chamber cavity; a first adjustment air inlet, a first aerosol inlet and a first sampling port are formed at one side of the mixing chamber cavity; the first adjustment air inlet is connected to the air flow temperature-humidity control system through a tube; the first aerosol inlet is connected to the output end of the aerosol generation device through a tube; a first aerosol outlet and a second sampling port are formed at the other side of the mixing chamber cavity; the first aerosol outlet is connected to the aerosol particle size screening module through a tube; the first sampling port and the second sampling port at two sides of the mixing chamber cavity respectively communicate with two aerosol sampling systems; the other side of the mixing chamber cavity provided with the first aerosol outlet is further provided with a first sensor; and the first sensor is electrically connected to the air flow temperature-humidity control system;

a first glass window for observation is formed in a sidewall of the donor animal chamber; a second adjustment air inlet, a second aerosol outlet and a third sampling port are respectively located on a lower part, an upper part and the top of the donor animal chamber; the second adjustment air inlet is connected to the air flow temperature-humidity control system through a tube; the second aerosol outlet is connected to the aerosol particle size screening module through a tube; the third sampling port communicates with the aerosol sampling system; a second sensor is further located on the top of the donor animal chamber; and the second sensor is electrically connected to the air flow temperature-humidity control system;

the aerosol particle size screening module comprises an impactor and an impactor stand; the impactor stand is set on the ground; the impactor is fixed on the impactor stand; ports are respectively formed at two sides of the impactor to serve as an inlet and an outlet of the impactor;

the inlet of the impactor is connected to the first aerosol outlet of the mixing chamber or the second aerosol outlet of the donor animal chamber through a tube; the tube from the impactor to each of the first aerosol outlet and the second aerosol outlet is provided with a first stop valve; and the outlet of the impactor is connected to the recipient animal chamber through a tube; and the recipient animal chamber comprises a fan, a second wire cage, a second wire cage stand, a third feeding water bottle, a third trough, and a second pump; a second glass window for observation is formed in a sidewall of the recipient animal chamber; the second wire cage stand is fixed at a bottom of the recipient animal chamber; the second wire cage is located in the recipient animal chamber and set on the second wire cage stand; the third feeding water bottle and the third trough are provided in the second wire cage; the fan is provided on a top of a recipient feeding chamber; the second wire cage does not come in contact with the fan; an exhaust air outlet, a second aerosol inlet, and a fourth sampling port are respectively located on a lower part, an upper part and a top of the recipient animal chamber; the second aerosol inlet is connected to the outlet of the impactor through a tube; the exhaust air outlet is connected to the second pump through a tube; the tube from the exhaust air outlet to the second pump is provided with a second filter; the fourth sampling port communicates with the aerosol sampling system; the top of the recipient animal chamber is further set with a third sensor; and the third sensor is electrically connected to the air flow temperature-humidity control system;

wherein the air flow temperature-humidity control system comprises a membrane dryer, a constant temperature and humidity air producing device, and a computer; the membrane dryer comprises an inlet communicating with an outside atmosphere, and an outlet communicating with an inlet of the constant temperature and humidity air producing device through a tube; an outlet of the constant temperature and humidity air producing device communicates with the first adjustment air inlet of the mixing chamber or the second adjustment air inlet of the donor animal chamber through a tube; the tube from the constant temperature and humidity air producing device to each of the first adjustment air inlet and the second adjustment air inlet is sequentially provided with a second flowmeter and a fourth filter; an insulating layer is set at a periphery of a tube at the outlet of the constant temperature and humidity air producing device; and the constant temperature and humidity air producing device, the first sensor, the second sensor and the third sensor are electrically connected to the computer.

2. The multifunctional animal exposure experimental device according to claim 1, wherein the aerosol sampling system comprises a sampling analyzer and a third pump; an output end of the third pump is connected to the first sampling port in the mixing chamber, the second sampling port in the mixing chamber, the third sampling port in the donor animal chamber and the fourth sampling port in the recipient animal chamber through tubes; and the tube from the third pump to each of the first sampling port, the second sampling port, the third sampling port and the fourth sampling port is sequentially provided with a second stop valve, the sampling analyzer and a third filter.

3. The multifunctional animal exposure experimental device according to claim 1, wherein the environmental temperature compensation system comprises an insulating layer, a phase-change material, an electric heating wire, a mixing fan, and a third glass window; the phase-change material, the electric heating wire and the mixing fan are set at a bottom of the insulating layer; a tube bulb is set at a top of the insulating layer; the third glass window is formed in a sidewall of the insulating layer; the mixing chamber, the donor animal chamber, the aerosol particle size screening module, the recipient animal chamber and the multi-route transmission system are set in the insulating layer; and the phase-change material, the electric heating wire and the mixing fan are electrically connected to the computer.

4. The multifunctional animal exposure experimental device according to claim 1, wherein the biosafety system comprises a biosafety cabinet cavity and a tube port; the tube port is formed in a sidewall of the biosafety cabinet cavity; and the mixing chamber, the donor animal chamber, the aerosol particle size screening module, the recipient animal chamber, the multi-route transmission system, the aerosol sampling system and the environmental temperature compensation system are set in the biosafety cabinet cavity.

5. The multifunctional animal exposure experimental device according to claim 1, wherein the aerosol sampling system performs sampling using a cascade impactor sampling method, a liquid impactor sampling method or a membrane sampling method.

* * * * *